United States Patent
Shimatani et al.

(10) Patent No.: US 12,442,353 B2
(45) Date of Patent: Oct. 14, 2025

(54) OFF-ROAD VEHICLE (71) Applicant: KAWASAKI MOTORS, LTD., Hyogo (JP)

(72) Inventors: Kengo Shimatani, Akashi (JP); Yuuto Ogawa, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 284 days.

(21) Appl. No.: 18/223,557

(22) Filed: Jul. 19, 2023

(65) Prior Publication Data

US 2025/0027466 A1   Jan. 23, 2025

(51) Int. Cl.
*F02M 35/02* (2006.01)
*F02M 35/16* (2006.01)

(52) U.S. Cl.
CPC ...... *F02M 35/0201* (2013.01); *F02M 35/162* (2013.01)

(58) Field of Classification Search
CPC ............. F02M 35/0201; F02M 35/162; F02M 35/02416; F02M 35/048
See application file for complete search history.

(56) References Cited

U.S. PATENT DOCUMENTS

| 2002/0088444 A1* | 7/2002 | Mashiko | F02M 25/06 |
| | | | 123/572 |
| 2020/0332748 A1 | 10/2020 | Xie | |
| 2021/0339179 A1 | 11/2021 | Que et al. | |

FOREIGN PATENT DOCUMENTS

| EP | 1241345 A2 * | 9/2002 | ....... F02M 35/10216 |
| EP | 2664776 A2 * | 11/2013 | ............. F02M 25/06 |
| JP | 2020082822 A * | 6/2020 | ....... F02M 35/10039 |
| RU | 2566862 C1 * | 10/2015 | ........... F02M 35/048 |

* cited by examiner

*Primary Examiner* — Justin Holmes
(74) *Attorney, Agent, or Firm* — XSENSUS LLP (57) ABSTRACT

An off-road vehicle includes an intake duct and an air cleaner. The intake duct defines a clean conduit. The air cleaner is connected to the intake duct, and includes an air cleaner case and an air cleaner element. The air cleaner case defines an internal space of the air cleaner. The air cleaner element divides the internal space into dirty and clean regions. The air cleaner case includes an intake port, an exhaust port, and a cylinder. The intake port faces the dirty region. The exhaust port faces the clean region and communicates with the clean conduit. The cylinder protrudes diagonally upward and toward the internal space. The cylinder has a protrusion end portion that is inclined relative to an imaginary radial plane in an angle direction from the plane toward an imaginary vertical plane. The imaginary radial plane is orthogonal to an axis of the cylinder.

20 Claims, 8 Drawing Sheets

OFF-ROAD VEHICLE

BACKGROUND OF THE INVENTION

Field of the Invention

The present disclosure relates to an off-road vehicle including an air cleaner.

Description of the Related Art

Off-road vehicles including internal combustion engines include intake conduits through which ambient air is supplied to the internal combustion engines for combustion purposes. Off-road vehicles including continuously variable transmissions include intake conduits through which ambient air is supplied to the continuously variable transmissions for cooling purposes. These intake conduits, at their internal spaces, can be divided into a dirty side and a clean side by an air cleaner.

During maintenance of the air cleaner, an air cleaner element is removed. At the time of removing the air cleaner element, there may be a case where dust attached to the air cleaner element scatters and then falls under the dust's own weight. The falling dust is likely to enter the air cleaner through the exhaust port.

It is an object of one embodiment of the present disclosure to make dust less likely to enter the clean side of an intake conduit in an air cleaner of an off-road vehicle.

SUMMARY OF THE INVENTION

According to the one embodiment of the present disclosure, an off-road vehicle includes an intake duct and an air cleaner. The intake duct defines a clean conduit. The air cleaner is connected to the intake duct. The air cleaner includes an air cleaner case and an air cleaner element. The air cleaner case defines an internal space of the air cleaner. The air cleaner element is contained in the air cleaner case and divides the internal space into a dirty region and a clean region. The air cleaner element includes a filter. The air cleaner case includes an intake port, an exhaust port, and a cylinder. The intake port faces the dirty region. The exhaust port faces the clean region and communicates with the clean conduit of the intake duct. The cylinder protrudes diagonally upward and toward the internal space. The cylinder has a protrusion end portion that defines the exhaust port and that is inclined relative to an imaginary radial plane in an angle direction from the imaginary radial plane toward an imaginary vertical plane. The imaginary radial plane is orthogonal to an axis of the cylinder.

In this configuration, in a state in which the air cleaner element is removed through the open lid, the area of the exhaust port as seen from vertically above is smaller than the area of the exhaust port as seen from an axis direction of the cylinder. When the air cleaner element is removed to subject the air cleaner to maintenance, there may be a case where dust attached to the air cleaner element or the case inner surface scatters and falls under dust's own weight. Even in this case, the above configuration makes scattering dust less likely to enter the exhaust port. As a result, in an air cleaner of an off-road vehicle, dust is less likely to enter the clean side of the intake conduit.

DETAILED DESCRIPTION

One embodiment will be described by referring to the accompanying drawings. In the following description, directions are based on an off-road vehicle 1 unless otherwise defined individually. Specifically, a front-rear direction corresponds to a vehicle length direction of the off-road vehicle 1, and a right-left direction corresponds to a width direction of the off-road vehicle 1.

Figure 1:
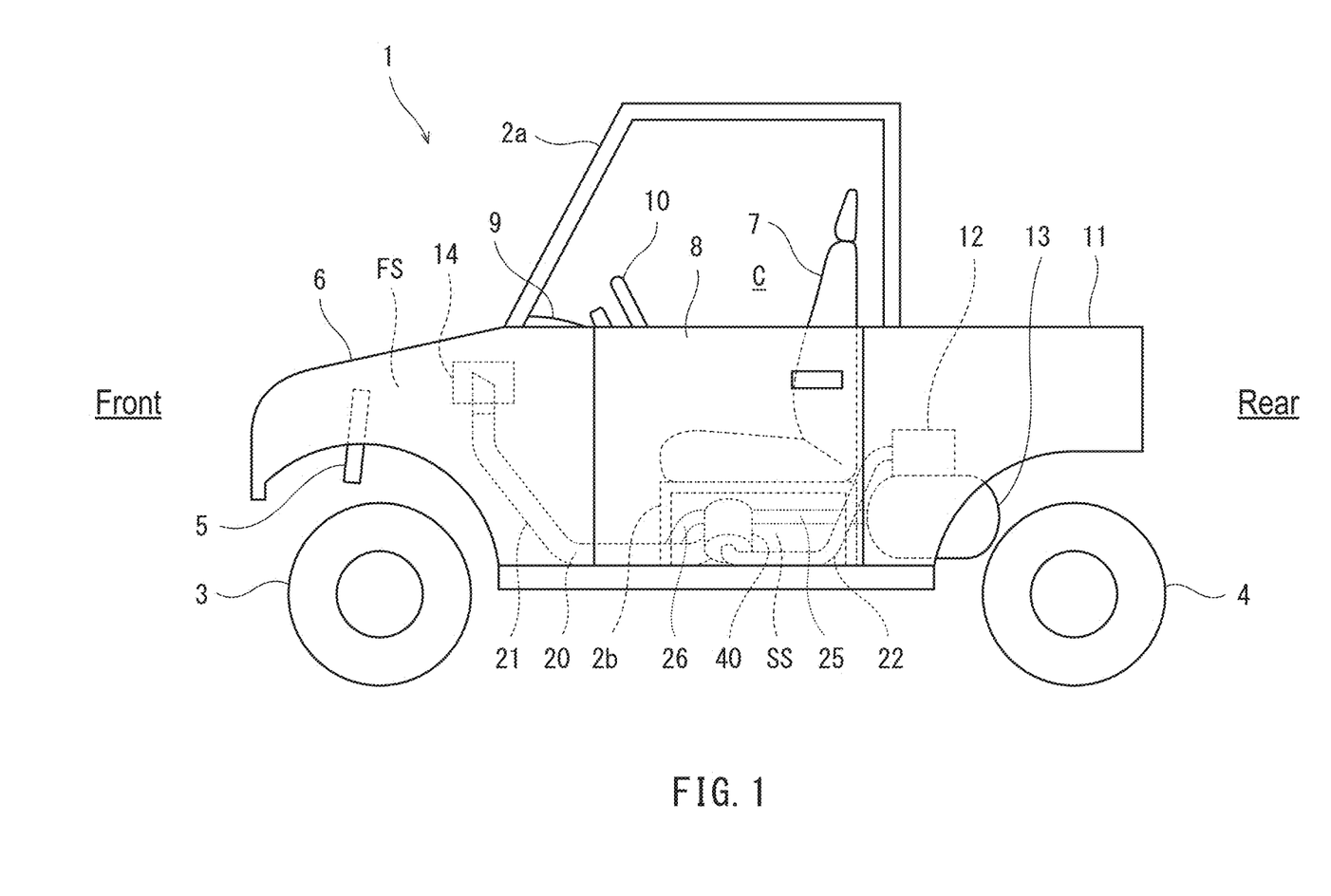
FIG. 1 is a left side view of an off-road vehicle according to one embodiment.

FIG. 1 is a left side view of the off-road vehicle 1 according to the one embodiment. As illustrated in FIG. 1, the off-road vehicle 1 includes a vehicle body frame 2, a pair of right and left front wheels 3, and a pair of right and left rear wheels 4. The pair of front wheels 3 support a front portion of the vehicle body frame 2. The pair of rear wheels 4 support a rear portion of the vehicle body frame 2. The front wheels 3 and the rear wheels 4 each include, for example, a balloon tire for irregular ground travel purposes. The off-road vehicle 1 can also be referred to as utility vehicle. A front space FS is defined between the right and left front wheels 3. In the front space FS, a front cover 6 is provided. Specifically, the front space FS is covered by the front cover 6 from above the front space FS. A pair of passenger seats 7 are provided side-by-side behind the front cover 6 and supported by the vehicle body frame 2.

The vehicle body frame 2 is a pipe frame made up of a plurality of pipes connected to each other. The vehicle body frame 2 includes elements such as a cabin frame 2a. The cabin frame 2a defines a cabin C. The front cover 6, which is supported by the vehicle body frame 2, is provided in the cabin C. At two sides of the cabin C, boarding openings and side doors 8 are provided. Each of the boarding openings is openable and closable by a corresponding side door 8. The cabin C, which is surrounded by the cabin frame 2a, is exposed to the outside. One of the pair of passenger seats 7 is a driver seat. A dashboard 9 is provided in front of the driver seat. A handle 10 is provided at the dashboard 9. The handle 10 protrudes toward the driver seat.

A cargo bed 11 is provided behind the cabin frame 2a. The cargo bed 11 defines a storage space having a depression shape exposed outward and upward. An internal combustion engine 12 and a continuously variable transmission 13 are provided behind the passenger seats 7 and under the cargo bed 11. The internal combustion engine 12 and the continuously variable transmission 13 are supported by the vehicle body frame 2. The continuously variable transmission 13 is provided adjacent to the internal combustion engine 12 to change in speed the driving force output from the internal combustion engine 12. The driving force output from the continuously variable transmission 13 is transmitted to the front wheels 3 and/or the rear wheels 4. An intake box 14 is provided in the front space FS, which is provided in front of the dashboard 9. The intake box 14 takes in external air.

The intake box 14 is connected to an intake port of the internal combustion engine 12 via an engine intake conduit 20. Through the engine intake conduit 20, combustion-use air is supplied to the internal combustion engine 12. Specifically, an upstream end portion of the first engine intake duct 21 is connected to the intake box 14, and a downstream end portion of the first engine intake duct 21 is connected to an air cleaner 40. An upstream end portion of a second engine intake duct 22 is connected to the air cleaner 40, and a downstream end portion of the second engine intake duct 22 is connected to the internal combustion engine 12 via a throttle device. That is, the engine intake conduit 20 is defined by the intake conduit of the first engine intake duct 21, the internal space of the air cleaner 40, and the intake conduit of the second engine intake duct 22.

The intake box 14 is connected to the intake port of the continuously variable transmission 13 via a CVT intake conduit 25. Through the CVT intake conduit 25, cooling-use air is supplied to the continuously variable transmission 13. Specifically, an upstream end portion of a CVT intake duct 26 is connected to the intake box 14, and a downstream end portion of the CVT intake duct 26 is connected to the continuously variable transmission 13. That is, the CVT intake conduit 25 is defined by the intake conduit of the CVT intake duct 26. It is to be noted that the first engine intake duct 21 and the CVT intake duct 26 are aligned with each other in the width direction of the off-road vehicle 1 and thus are seen as overlapping in the left side view illustrated in FIG. 1.

Figure 2:
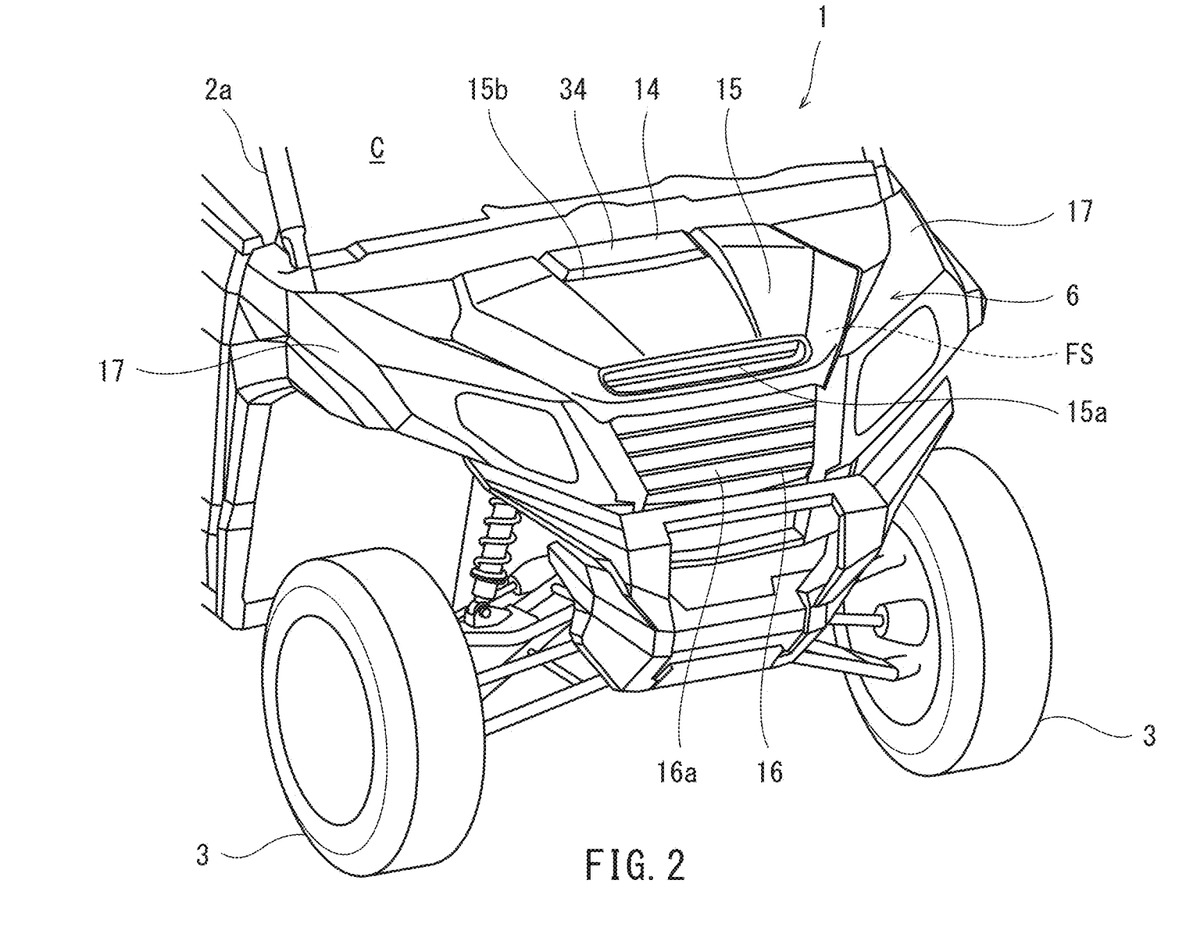
FIG. 2 is a perspective view a front portion of the off-road vehicle illustrated in FIG. 1.

FIG. 2 is a perspective view of a front portion of the off-road vehicle 1 illustrated in FIG. 1. As illustrated in FIG. 2, the front cover 6 is provided at the front portion of the off-road vehicle 1. The front cover 6 covers the front space FS at least partially from above and ahead of the front space FS. The front cover 6 has an outer surface exposed to outside the off-road vehicle 1. The front cover 6 includes a hood 15, a front grille 16, a pair of front side cowls 17, and a heat shield cover 18 (see FIG. 3).

The hood 15 has an outer surface exposed to outside the off-road vehicle 1, and covers the front space FS at least partially from above the front space FS. The hood 15 is provided at a center of the front portion of the off-road vehicle 1 in the width direction of the off-road vehicle 1. The hood 15 has a front opening 15a at a front portion of the hood 15. While the off-road vehicle 1 is running, air enters the space under the hood 15 through the front opening 15a of the hood 15. The hood 15 also has a cutout 15b at a rear portion of the hood 15. The cutout 15b is shaped to fit the outer shape of a top wall 34 of the intake box 14. The intake box 14 has an approximately rectangular parallelepiped shape. The top wall 34 of the intake box 14 is exposed to outside the off-road vehicle 1 through the cutout 15b of the hood 15. The hood 15 permits the top wall 34 of the intake box 14 to be exposed, instead of covering the top wall 34. This configuration makes the hood 15 lighter in weight. The hood 15 abuts on the top wall 34 of the intake box 14 in a horizontal direction. The upper surface of the top wall 34 of the intake box 14 is substantially flush (level) with the upper surface of the hood 15. This configuration keeps the hood 15 and surrounding members pleasing in appearance, even though the top wall 34 of the intake box 14 is exposed to outside the off-road vehicle 1.

The front grille 16 is provided ahead of the hood 15, and has an outer surface exposed to outside the off-road vehicle 1. The front grille 16 covers the front space FS at least partially from ahead of the front space FS. The front grille 16 includes air guide holes 16a. The air guide holes 16a face a radiator 5 (see FIG. 1), which is provided in the front space FS, from ahead of the radiator 5. While the off-road vehicle 1 is running, air flows toward the radiator 5 through the air guide holes 16a of the front grille 16.

Each front side cowl 17 of the pair of front side cowls 17 has an outer surface exposed to outside the off-road vehicle 1, and is provided at one of the two sides of the hood 15 and the front grille 16 in the width direction of the off-road vehicle. The each front side cowl 17 covers the front space FS at least partially on the one side of the front space FS.

Figure 3:
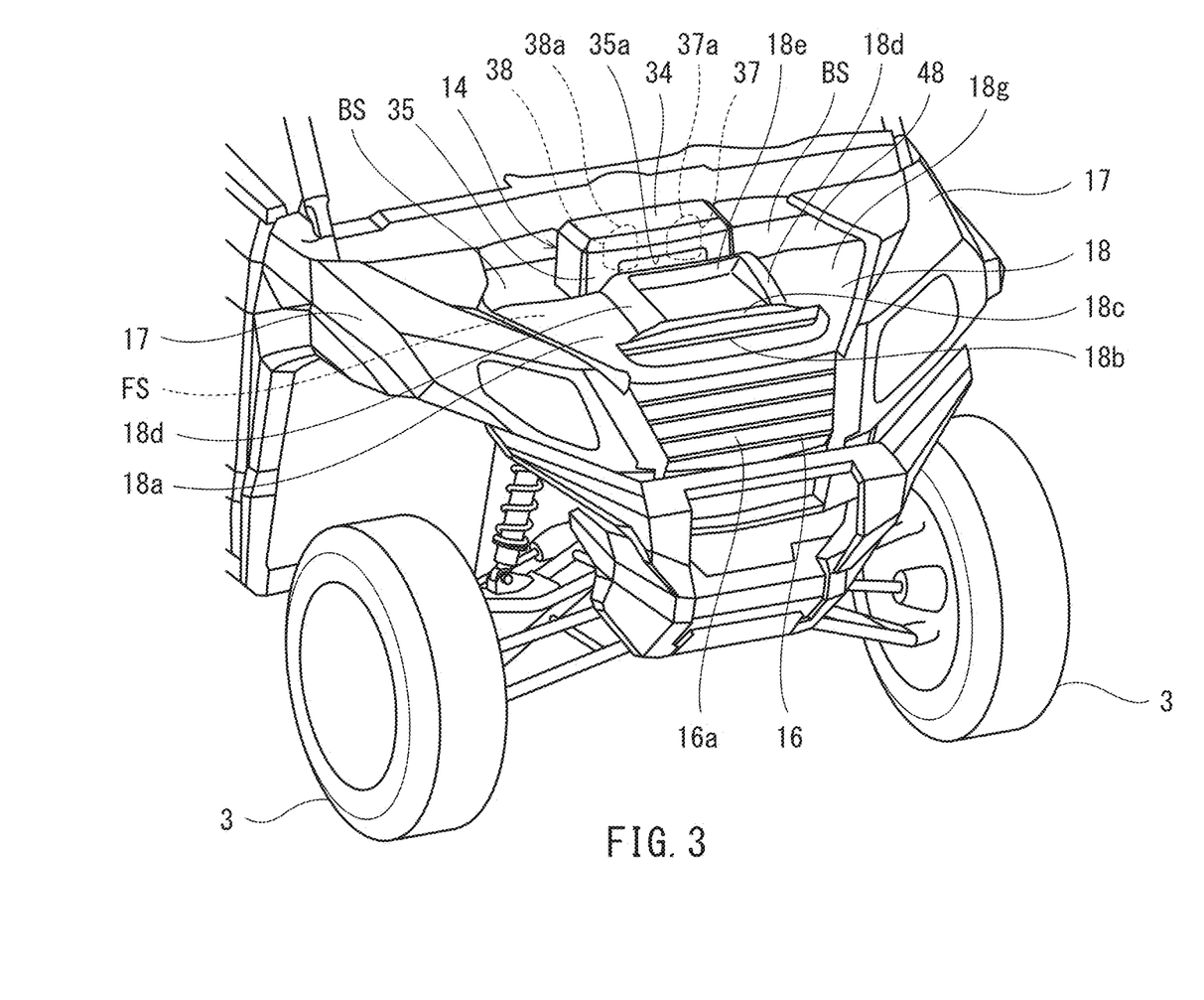
FIG. 3 is a perspective view of the front portion of the off-road vehicle illustrated in FIG. 2 with the vehicle's hood removed.

FIG. 3 is a perspective view of the front portion of the off-road vehicle 1 illustrated in FIG. 2 with the hood 15 removed. As illustrated in FIG. 3, the heat shield cover 18 is provided below the hood 15 (see FIG. 2). The heat shield cover 18 covers the radiator 5 (see FIG. 1) from above the radiator 5. The intake box 14, which has an approximately rectangular parallelepiped shape, is provided behind the heat shield cover 18. The intake box 14 has an opening 35a. Through the opening 35a, an internal space 32 of the intake box 14 is exposed to outside the intake box 14. Specifically, the opening 35a of the intake box 14 is provided at a front wall 35 of the intake box 14 to make the internal space 32 to be exposed in a forward direction. That is, the opening 35a of the intake box 14 is provided behind the front opening 15a (see FIG. 2) of the hood 15.

A side upper cover 48 is provided at the two sides of the intake box 14 in the width direction of the off-road vehicle 1. The side upper cover 48 is provided below the hood 15 (see FIG. 2), and covers the front space FS from above the front space FS. The side upper cover 48 is lower in position than the top wall 34 of the intake box 14. The side upper cover 48 is spaced apart in a downward direction from the hood 15 (see FIG. 2). An air buffer space BS is defined between the side upper cover 48 and the hood 15. In other words, the air buffer space BS abuts on the intake box 14 at its two sides in the width direction of the off-road vehicle 1. The air buffer space BS communicates with the opening 35a of the intake box 14 in the space under the hood 15 (see FIG. 2). It is to be noted that electric equipment may be provided in the air buffer space BS over the side upper cover 48.

The heat shield cover 18 has a plate body 18a and a front opening 18b. The front opening 18b is provided at a front portion of the plate body 18a. The front opening 18b of the heat shield cover 18 faces an upper portion of the radiator 5 (see FIG. 1) from ahead of the upper portion. While the off-road vehicle 1 is running, part of the air inflowing through the front opening 15a of the hood 15 (see FIG. 2) flows toward the upper portion of the radiator 5 through the front opening 18b of the heat shield cover 18. The upper surface of the plate body 18a of the heat shield cover 18 is inclined frontward and downward relative to the horizontal direction.

The heat shield cover 18 has a front shield wall 18c at a front portion of the heat shield cover 18. The front shield wall 18c is provided behind the front opening 18b, and protrudes from the plate body 18a upward and toward the lower surface of the hood 15. The front shield wall 18c extends in the width direction of the off-road vehicle 1. Two ends of the front shield wall 18c in the width direction of the off-road vehicle 1 are spaced apart inward in the width direction of the off-road vehicle 1 from two edges of the plate body 18a in the width direction of the off-road vehicle 1. The heat shield cover 18 includes a pair of guides 18d. The pair of guides 18d are provided behind the front shield wall 18c, and extend in a front-rear direction of the off-road vehicle 1. The pair of guides 18d protrude upward from the plate body 18a and face outward in the width direction of the off-road vehicle 1. Each guide 18d of the pair of guides 18d has an outer side surface in the width direction of the off-road vehicle 1. A rear end of the outer side surface is provided further outward than the opening 35a of the intake box 14 in the width direction of the off-road vehicle 1. With this configuration, when air flows rearward along the outer side surface of the each guide 18d, the air is caused to flow toward the air buffer space BS, instead of flowing toward the opening 35a of the intake box 14.

The heat shield cover 18 has a rear shield wall 18e at a rear portion of the heat shield cover 18. The rear shield wall 18e protrudes from the plate body 18a upward and toward the lower surface of the hood 15. The rear shield wall 18e extends in the width direction of the off-road vehicle 1. The rear shield wall 18e covers the opening 35a of the intake box 14 from ahead of the opening 35a such that the rear shield wall 18e is spaced apart from the opening 35a. Two ends of the rear shield wall 18e in the width direction of the off-road vehicle 1 are provided further outward in the width direction of the off-road vehicle 1 than two ends of the opening 35a of the intake box 14 in the width direction of the off-road vehicle 1. The two ends of the rear shield wall 18e in the width direction of the off-road vehicle 1 are spaced apart inward in the width direction of the off-road vehicle 1 from the two edges of the plate body 18a in the width direction of the off-road vehicle 1. Each of the two ends of the rear shield wall 18e in the width direction of the off-road vehicle 1 is connected to a rear end of the each guide 18d.

Figure 4:
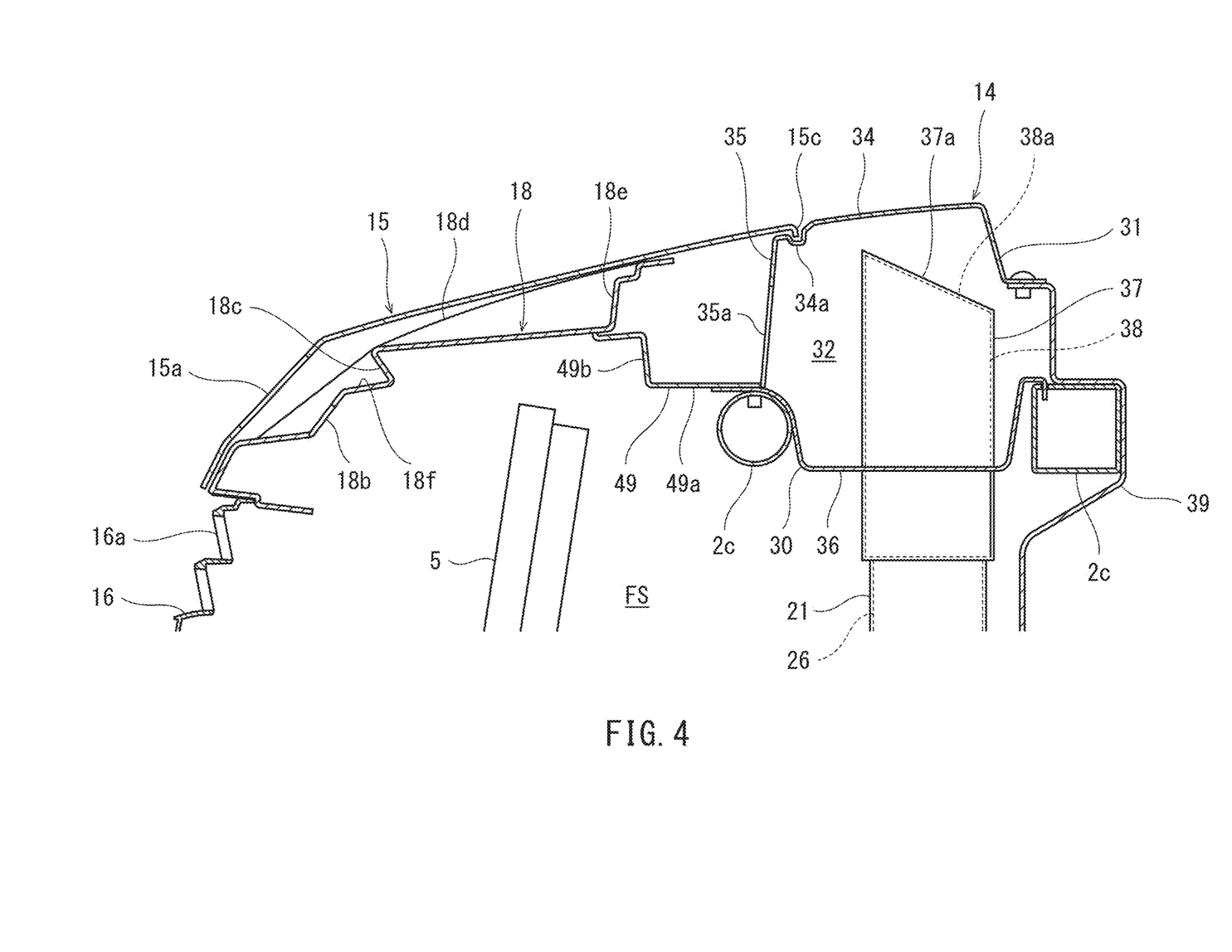
FIG. 4 is a longitudinal sectional view, as seen from a width direction of the off-road vehicle, of the front portion of the off-road vehicle illustrated in FIG. 2, the longitudinal sectional view being along a plane including a center part of the front portion in the width direction.

FIG. 4 is a longitudinal sectional view, as seen from the width direction of the off-road vehicle 1, of the front portion of the off-road vehicle 1 illustrated in FIG. 2, the longitudinal sectional view being along a plane including a center part of the front portion in the width direction. Specifically, FIG. 4 is a sectional view along a plane across the opening 35a of the intake box 14 in the front-rear direction of the off-road vehicle 1. As illustrated in FIG. 4, the intake box 14 includes a lower case 30 and an upper case 31. The upper case 31 is an element separate from the lower case 30. A part of the front wall 35 and the top wall 34 of the intake box 14 are made up of the upper case 31. The other part of the front wall 35 and a bottom wall 36 of the intake box 14 are made up of the lower case 30.

The vehicle body frame 2 includes a pair of cross-frames 2c. The pair of cross-frames 2c are provided ahead of a front panel 39. The front panel 39 partitions the cabin C from the front space FS. The pair of cross-frames 2c extend in the width direction of the off-road vehicle 1, and are spaced apart from each other in the front-rear direction of the off-road vehicle 1. The intake box 14 is supported by the pair of cross-frames 2c. The lower case 30 is fixed to, for example, the cross-frames 2c. The upper case 31 covers the lower case 30 from above the lower case 30, and is indirectly fixed to the cross-frames 2c.

The intake box 14 includes a first introduction duct 37 and a second introduction duct 38. The first introduction duct 37 and the second introduction duct 38 are aligned with each other in the width direction of the off-road vehicle 1 (see FIG. 3). The first introduction duct 37 and the second introduction duct 38 protrude from the bottom wall 36 of the intake box 14 upward and toward the internal space 32. The first introduction duct 37 and the second introduction duct 38 also protrude downward and outward from the bottom wall 36 of the intake box 14. A lower end of the first introduction duct 37 is connected to the first engine intake duct 21, and a lower end of the second introduction duct 38 is connected to the CVT intake duct 26. The lower case 30, the first introduction duct 37, and the second introduction duct 38 constitute a one-piece structure. That is, the first introduction duct 37 and the second introduction duct 38 are integrally formed with the lower case 30. It is to be noted that the first introduction duct 37, the second introduction duct 38, and the lower case 30 may be separate structures.

The first introduction duct 37 and the second introduction duct 38 are spaced apart from the upper case 31. With this configuration, a worker only has to remove the upper case 31 in making access to the upper surface of the lower case 30 and the introduction ducts 37 and 38, that is, the lower case 30 is kept being fixed to the vehicle body frame 2. Thus, the above configuration ensures excellent maintainability of the intake box 14.

The first introduction duct 37 has an upper protrusion end portion that defines an inlet 37a of the engine intake conduit 20. The first introduction duct 37 has an internal conduit that serves as an introduction conduit through which the internal space 32 communicates with the intake conduit of the first engine intake duct 21. The second introduction duct 38 has an upper protrusion end portion that defines an inlet 38a of the CVT intake conduit 25. The second introduction duct 38 has an internal conduit that serves as an introduction conduit through which the internal space 32 communicates with the intake conduit of the CVT intake duct 26. The inlet 37a of the engine intake conduit 20 and the inlet 38a of the CVT intake conduit 25 are provided in the internal space 32 of the intake box 14. The inlet 37a of the engine intake conduit 20 and the inlet 38a of the CVT intake conduit 25 are covered by the intake box 14, which has the opening 35a at the front wall 35. This configuration restricts the passage through which water or dust enters the inlet 37a of the engine intake conduit 20 and the inlet 38a of the CVT intake conduit 25.

The inlet 37a of the engine intake conduit 20 is provided at an upper portion of the introduction duct 37, which protrudes upward from the bottom wall 36 of the intake box 14. The inlet 38a of the CVT intake conduit 25 is provided at an upper portion of the introduction duct 38, which protrudes upward from the bottom wall 36 of the intake box 14. The bottom wall 36 of the intake box 14 is provided below a lower end of the opening 35a of the intake box 14. Due to this configuration, the introduction ducts 37 and 38 protrude upward over a large height from the bottom wall 36. The inlet 37a of the introduction duct 37 and the inlet 38a of the introduction duct 38 face in a direction away from the opening 35a of the intake box 14. That is, the inlet 37a of the introduction duct 37 and the inlet 38a of the introduction duct 38 are oriented rearward. Specifically, the introduction duct 37 has a protrusion end portion that defines the inlet 37a, and the introduction duct 38 has a protrusion end portion that defines the inlet 38a. These protrusion end portions are inclined rearward and downward in a side view of the protrusion end portions. An uppermost end of the introduction duct 37 and an uppermost end of the introduction duct 38 are higher in position than the opening 35a of the intake box 14. With this configuration described in relation to the introduction ducts 37 and 38, even if dust or water enters the internal space 32 through the opening 35a of the intake box 14, it is difficult for such dust or water to enter the inlet 37a of the introduction duct 37 and the inlet 38a of the introduction duct 38.

In the front space FS, the radiator 5 is provided ahead of and below the intake box 14. When running air passes through the air guide holes 16a of the front grille 16, such running air is guided to the radiator 5. The heat shield cover 18 is provided ahead of the intake box 14, and covers the radiator 5 from above the radiator 5.

The heat shield cover 18 is closest to the hood 15 at a front end portion and a rear end portion of the heat shield cover 18. The hood 15 is supported by the front end portion and the rear end portion of the heat shield cover 18. The intake box 14 has a receiving groove 34a at a front end portion of the top wall 34 of the intake box 14. The receiving groove 34a extends in the width direction of the off-road vehicle 1. The hood 15 has a fitting protrusion 15c at a rear end portion of the hood 15. The fitting protrusion 15c is bent downward. The fitting protrusion 15c of the hood 15 is fitted with the receiving groove 34a, which is at the top wall 34 of the intake box 14, from above the receiving groove 34a. In this manner, the hood 15 is positioned relative to the intake box 14.

The front opening 18b of the heat shield cover 18 faces a lower portion of the front opening 15a of the hood 15 from below the lower portion. The front opening 18b of the heat shield cover 18 is open in an inclined manner, that is, open frontward and upward. The front shield wall 18c of the heat shield cover 18 is provided between the front opening 15a of the hood 15 and the opening 35a of the intake box 14. The front shield wall 18c of the heat shield cover 18 faces an upper portion of the front opening 15a of the hood 15 from below the upper portion. An upper end portion of the front shield wall 18c of the heat shield cover 18 is higher in position than an upper end portion of the front opening 15a of the hood 15, or identical in height to the upper end portion of the front opening 15a of the hood 15. A lower end portion of the front shield wall 18c of the heat shield cover 18 is lower in position than the upper end portion of the front opening 15a of the hood 15.

The front surface of the front shield wall 18c of the heat shield cover 18 is inclined forward relative to a vertical direction in a side view of the front surface. The front surface also faces frontward and downward. The heat shield cover 18 has an inclined surface 18f. The inclined surface 18f extends and inclines frontward and downward relative to the horizontal direction to connect the front shield wall 18c to the front opening 18b. In some cases, rainwater inflowing through the front opening 15a of the hood 15 passes through the front opening 18b of the heat shield cover 18 and reaches the space under the heat shield cover 18. In other cases, rainwater inflowing through the front opening 15a collides with the front shield wall 18c of the heat shield cover 18. Rainwater that has collided with the front shield wall 18c may flow forward on the inclined surface 18f and inflow through the front opening 18b. Since the front space FS is exposed downward to the ground, rainwater reaching the space under the heat shield cover 18 falls to the ground.

The front shield wall 18c of the heat shield cover 18 is provided below the hood 15 and is spaced apart from the hood 15. The rear shield wall 18e of the heat shield cover 18 is provided behind the front shield wall 18c and is spaced apart from the front shield wall 18c. The rear shield wall 18e is provided between the front opening 15a of the hood 15 and the opening 35a of the intake box 14. The gap between an upper end portion of the rear shield wall 18e and the lower surface of the hood 15 is smaller than the gap between the upper end portion of the front shield wall 18c and the lower surface of the hood 15. For example, the upper end portion of the rear shield wall 18e abuts on the lower surface of the hood 15. In a case where rainwater inflows through the front opening 15a of the hood 15 and flows rearward through the gap between the upper end portion of the front shield wall 18c and the lower surface of the hood 15, this rainwater collides with the rear shield wall 18e. That is, the rear shield wall 18e prevents the rainwater from proceeding toward the opening 35a of the intake box 14.

The heat shield cover 18 is provided ahead of the intake box 14 and is spaced apart from the intake box 14. A front upper cover 49 is provided between the heat shield cover 18 and the intake box 14. The front upper cover 49 covers the front space FS from above the front space FS. The front upper cover 49 connects a lower portion of the opening 35a of the intake box 14 to a lower end portion of the rear shield wall 18e of the heat shield cover 18. The front upper cover 49 includes a plate body 49a and a shield wall 49b. The plate body 49a extends forward from the lower portion of the opening 35a of the intake box 14. The shield wall 49b protrudes upward from a front end portion of the plate body 49a. The shield wall 49b is provided below the rear shield wall 18e of the heat shield cover 18, and is connected to the lower end portion of the rear shield wall 18e of the heat shield cover 18.

In a case where rainwater passes through the front opening 15a of the hood 15 and the front opening 18b of the heat shield cover 18 and reaches the space under the heat shield cover 18, this rainwater is prevented from proceeding toward the opening 35a of the intake box 14 by the front upper cover 49. In the space over the front upper cover 49, electric equipment may be provided. The upper case 31, the front upper cover 49, and the side upper cover 48 (see FIGS. 3 and 5) constitute a one-piece structure. That is, the upper case 31, the front upper cover 49, and the side upper cover 48 are integrally formed. This configuration eliminates or minimizes an increase in piece-part count. It is to be noted that the lower case 30, the front upper cover 49, and the side upper cover 48 may constitute a one-piece structure and that the upper case 31 may be an element separate from this one-piece structure. The upper case 31, the front upper cover 49, and the side upper cover 48 each may be a separate structure.

Figure 5:
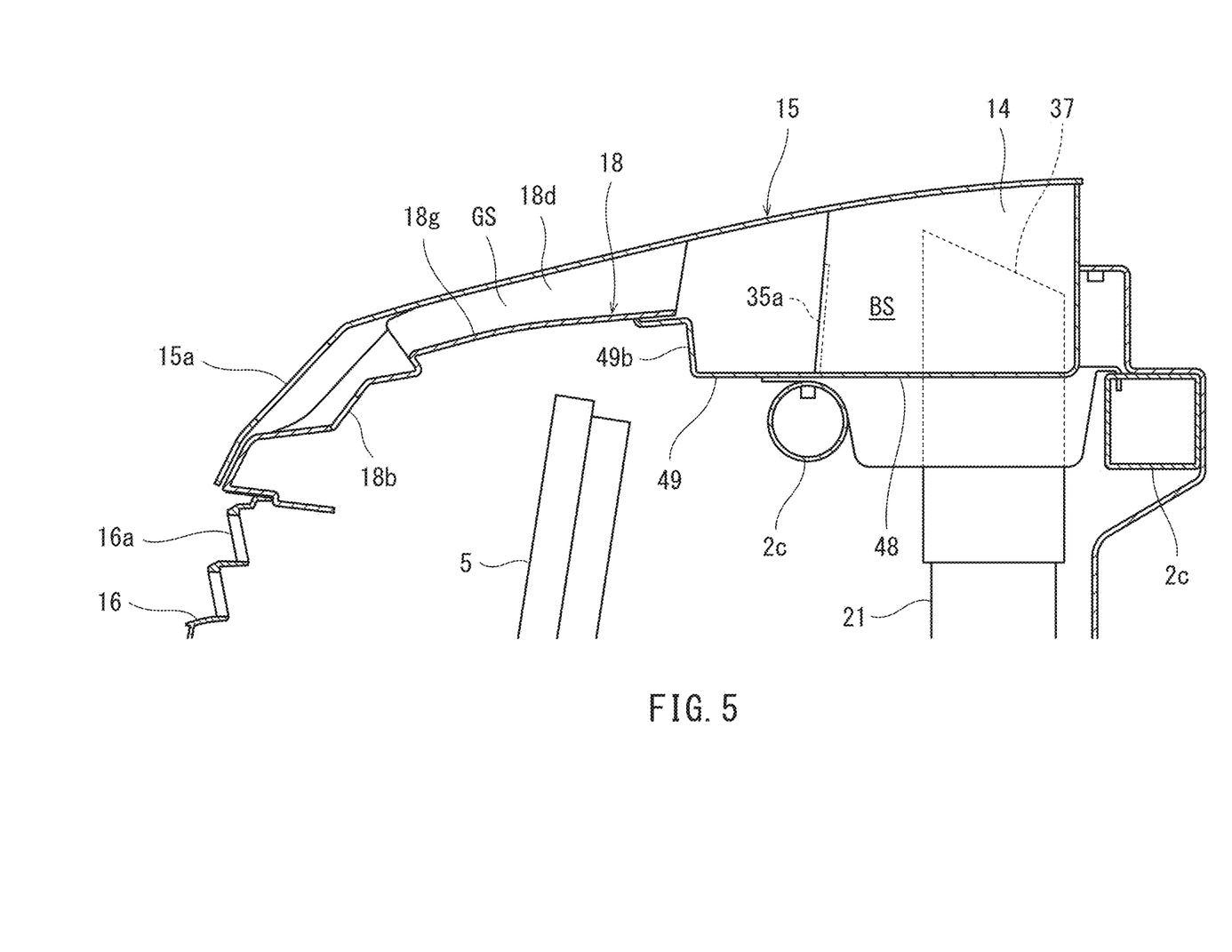
FIG. 5 is a longitudinal sectional view, as seen from the width direction, of the front portion of the off-road vehicle, the longitudinal sectional view being along a plane including an other part of the front portion shifted to one side of the width direction from the center part in the sectional view illustrated in FIG. 4.

FIG. 5 is a longitudinal sectional view, as seen from the width direction, of the front portion of the off-road vehicle 1, the longitudinal sectional view being along a plane including an other part of the front portion shifted to one side of the width direction from the center part in the sectional view illustrated in FIG. 4. Specifically, FIG. 5 is a sectional view along a plane across the air buffer space BS in the front-rear direction of the off-road vehicle 1 (the air buffer space BS abuts on the intake box 14 at its two sides in the width direction of the off-road vehicle 1). As illustrated in FIGS. 3 and 5, an upper surface 18g of the plate body 18a is provided further outward than the pair of guides 18d of the heat shield cover 18 in the width direction of the off-road vehicle 1. The upper surface 18g is provided below the hood 15 and is spaced apart from the hood 15. There is a gap GS between the lower surface of the hood 15 and the upper surface 18g (which is provided further outward than the pair of guides 18d of the heat shield cover 18 in the width direction of the off-road vehicle 1). The gap GS is exposed in the forward direction toward the front opening 15a of the hood 15. The gap GS is also exposed in the rearward direction toward the air buffer space BS. The air buffer space BS communicates with the opening 35a of the intake box 14 through the space over the front upper cover 49.

In a case where air inflows through the front opening 15a of the hood 15, this air is guided by the pair of guides 18d of the heat shield cover 18 to reach the air buffer space BS. Then, the air in the air buffer space BS flows in the width direction of the off-road vehicle 1 and reaches the opening 35a of the intake box 14. That is, in a case where air inflows through the front opening 15a of the hood 1, it is necessary to change the direction of the air before the air reaches the opening 35a of the intake box 14. This makes it difficult for the water or dust contained in the air to reach the opening 35a of the intake box 14. The air inflowing through the front opening 15a of the hood 15 is guided to the opening 35a of the intake box 14 through the space over the heat shield cover 18. This eliminates or minimizes an increase in temperature of the air entering the intake box 14 through the opening 35a.

Figure 6:
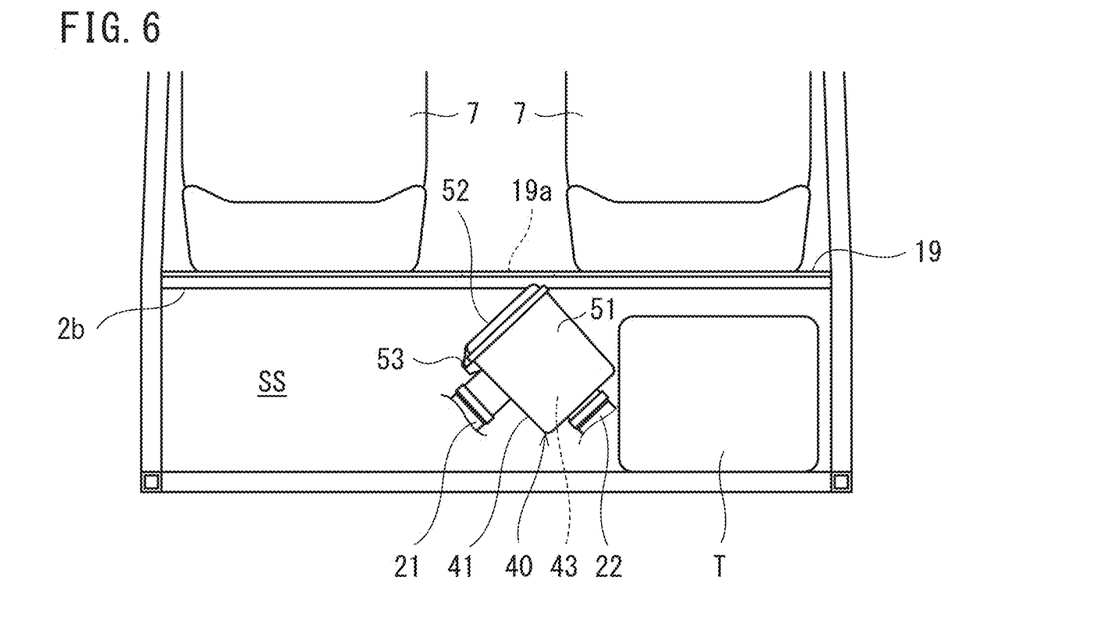
FIG. 6 is a longitudinal sectional view of a part of the off-road vehicle illustrated in FIG. 1 as seen from a front of the off-road vehicle.

FIG. 6 is a longitudinal sectional view of a part of the off-road vehicle 1 illustrated in FIG. 1 as seen from the front of the off-road vehicle 1. As illustrated in FIG. 6, the air cleaner 40 is provided in an under-seat space SS. The under-seat space SS is a space under a seat support panel 19. To the air cleaner 40, the first engine intake duct 21 and the second engine intake duct 22 are connected. The first engine intake duct 21 defines a dirty conduit. The second engine intake duct 22 defines a clean conduit. A fuel tank T is also provided in the under-seat space SS, which is the space under the seat support panel 19. The fuel tank T is an on-vehicle article example. The fuel tank T abuts on the air cleaner 40 in the width direction of the off-road vehicle 1. Specifically, the fuel tank T is provided immediately under the passenger seats 7, and the air cleaner 40 is provided further inward than the fuel tank T in the width direction of the off-road vehicle 1.

The air cleaner 40 includes an air cleaner case 41. The air cleaner case 41 defines an internal space 43 of the air cleaner 40. The air cleaner case 41 has an outer circumferential surface having a substantially cylindrical shape. The air cleaner 40 has a size in its axis direction larger than the size of the air cleaner 40 in its radial direction. The air cleaner case 41 includes a case body 51 and a lid 52. The case body 51 has an opening 60 (see FIG. 7), through which the internal space 43 is exposed upward. The lid 52 closes the opening 60 of the case body 51 from above the opening 60.

An axis X of the air cleaner case 41 is inclined relative to the vertical direction in a direction in which the lid 52 is away from the fuel tank T. This inclination configuration makes the occupation space of the air cleaner 40 in the horizontal direction smaller than when the axis X is pointed in the horizontal direction, eliminating or minimizing a decrease in the occupation space of the fuel tank T. Also in the above inclination configuration, the lid 52 of the air cleaner 40, which abuts on the fuel tank T, is further away from the fuel tank T than when the axis X is pointed in the vertical direction. This facilitates attachment work and detachment work of the lid 52.

The axis X of the air cleaner case 41 is inclined upward and toward one side of the width direction of the off-road vehicle 1. A part of the first engine intake duct 21 is connected to the intake port of the air cleaner 40. This part of the first engine intake duct 21 is provided in the space under the air cleaner case 41. A part of the second engine intake duct 22 is connected to the exhaust port of the air cleaner 40. This part of the second engine intake duct 22 is provided in the space under the air cleaner case 41. That is, the part of the first engine intake duct 21 and the part of the second engine intake duct 22 overlap with the air cleaner case 41 in the vertical direction. An upper end portion of the first engine intake duct 21 and an upper end portion of the second engine intake duct 22 are positioned above a lowermost portion of the air cleaner case 41. Thus, the space defined under the inclined air cleaner case 41 is utilized to efficiently provide the first engine intake duct 21 and the second engine intake duct 22, which are adjacent to the air cleaner case 41.

Figure 7:
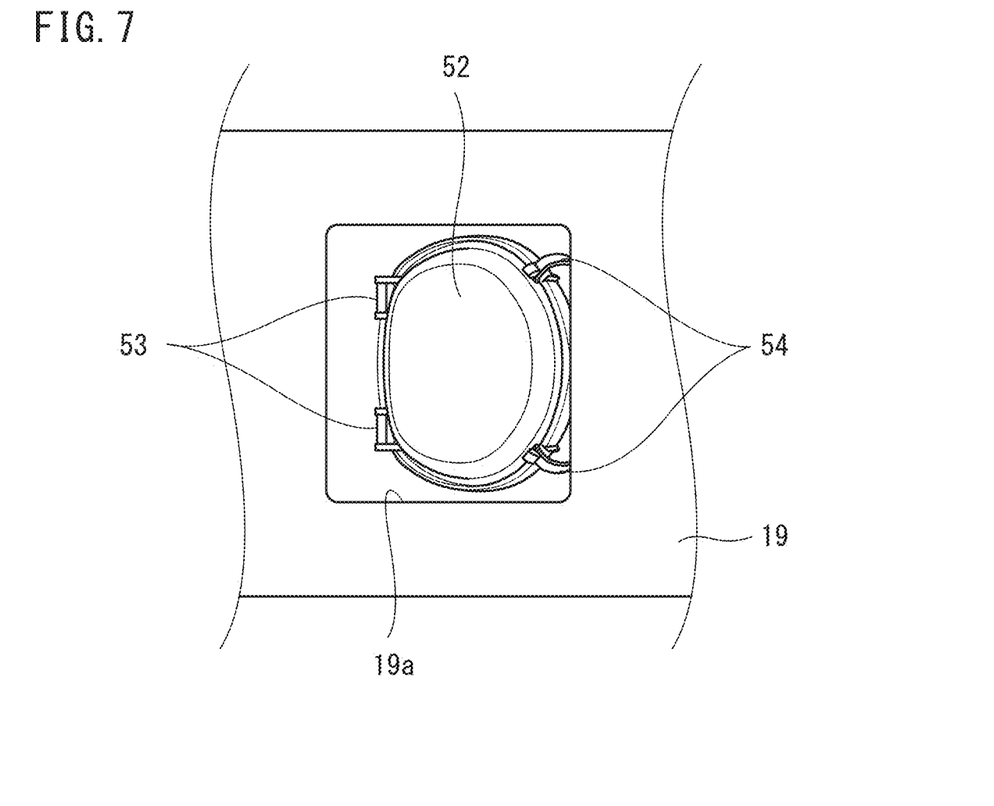
FIG. 7 is a top view of: a maintenance opening of a seat support panel illustrated in FIG. 6; and elements around the maintenance opening.

FIG. 7 is a top view of: a maintenance opening 19a of the seat support panel 19 illustrated in FIG. 6; and elements around the maintenance opening 19a. As illustrated in FIG. 7, the under-seat space SS is exposed upward through the maintenance opening 19a of the seat support panel 19. The maintenance opening 19a is provided between the pair of right and left passenger seats 7. In the illustrated top view of the maintenance opening 19a in the cabin C, at least a part of the lid 52 of the air cleaner 40 is exposed through the maintenance opening 19a. The air cleaner 40 is inclined toward the one side of the width direction of the off-road vehicle 1. The one side of the width direction is a direction toward the maintenance opening 19a (see FIG. 6).

The lid 52 is rotationally movably connected to the case body 51 (see FIG. 6) via hinges 53. The air cleaner 40 includes locks 54. The locks 54 lock the lid 52 to the case body 51. In the illustrated top view of the maintenance opening 19a, the locks 54 are exposed through the maintenance opening 19a. This configuration ensures that at the time of maintenance of the air cleaner 40, the lid 52 is easily openable through the maintenance opening 19a of the seat support panel 19.

Figure 8:
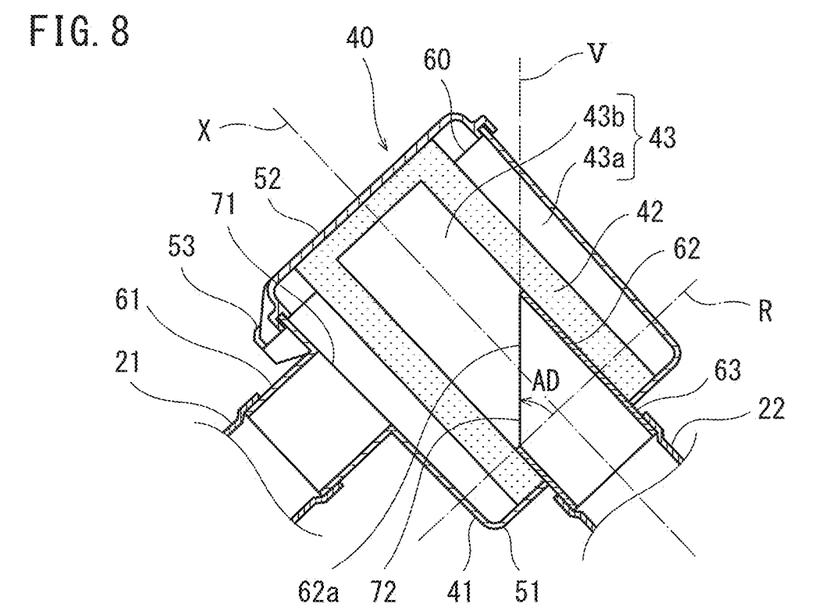
FIG. 8 is a longitudinal sectional view of an air cleaner illustrated in FIG. 6 as seen from a front of the air cleaner.

FIG. 8 is a longitudinal sectional view of the air cleaner 40 illustrated in FIG. 6 as seen from the front of the air cleaner 40. As illustrated in FIG. 8, the air cleaner 40 includes the air cleaner case 41 and an air cleaner element 42. The air cleaner element 42 is contained in the air cleaner case 41, and includes a filter. The internal space 43 of the air cleaner case 41 is divided into a dirty region 43a and a clean region 43b by the air cleaner element 42. Specifically, the dirty region 43a is provided at an upstream side of the air cleaner element 42 in the internal space 43, and the clean region 43b is provided at a downstream side of the air cleaner element 42 in the internal space 43.

The air cleaner case 41 has a round cylinder shape having the axis X. The air cleaner case 41 includes the case body 51 and the lid 52. The case body 51 has the opening 60, an intake port 71, and an exhaust port 72. Through the opening 60, the internal space 43 is exposed upward. The opening 60 is shaped and sized to permit the air cleaner element 42 to pass through the opening 60. The intake port 71 faces the dirty region 43a and communicates with the dirty conduit of the first engine intake duct 21. The exhaust port 72 faces the clean region 43b and communicates with the clean conduit of the second engine intake duct 22.

The case body 51 includes an exhaust side inner cylinder 62 and an exhaust side outer cylinder 63. The exhaust side inner cylinder 62 protrudes toward the internal space 43. The exhaust side outer cylinder 63 communicates with the exhaust side inner cylinder 62 and protrudes toward the outside coaxially with the exhaust side inner cylinder 62. Exhaust side inner cylinder 62 and the exhaust side outer cylinder 63 are provided at a lower portion of the case body 51. The second engine intake duct 22 is connected to the exhaust side outer cylinder 63. The exhaust side inner cylinder 62, at its protrusion end portion, defines the exhaust port 72. The exhaust port 72 has an axis identical to the axis X of the air cleaner case 41. The axis X of the exhaust port 72 extends in an exhaust direction of the exhaust port 72. That is, the axis X of the exhaust port 72 extends in a protrusion direction of the exhaust side inner cylinder 62.

The air cleaner element 42 has a bottomed cylinder shape. The air cleaner element 42 is fitted with the exhaust side inner cylinder 62 in a direction parallel to the protrusion direction of the exhaust side inner cylinder 62. The protrusion direction of the exhaust side inner cylinder 62 is opposite and parallel to the exhaust direction of the exhaust port 72. Hence, the air cleaner element 42, which has a bottomed cylinder shape, is fitted with the exhaust side inner cylinder 62 in the exhaust direction of the exhaust port 72. The exhaust side inner cylinder 62 serves as an element support supporting the air cleaner element 42. The air cleaner element 42 supported by the exhaust side inner cylinder 62 is provided radially inward in the case body 51 relative to the cylindrical inner circumferential surface of the case body 51 so that there is a space between the air cleaner element 42 and the inner circumferential surface of the case body 51.

The case body 51 includes an intake side outer cylinder 61. The intake side outer cylinder 61 protrudes toward the outside. The intake side outer cylinder 61 is provided at a round-cylindrical circumferential wall of the case body 51. The first engine intake duct 21 is connected to the intake side outer cylinder 61. The intake side outer cylinder 61 defines the intake port 71, which faces the internal space 43. The exhaust port 72 is provided below the intake port 71. The intake port 71 and the exhaust port 72 are provided at the case body 51. This configuration eliminates the need for removing the intake ducts 21 and 22 in opening the lid 52.

The hinges 53 are provided at a lower end portion of the inclined lid 52. Specifically, the hinges 53 are provided below the axis X of the air cleaner case 41. When the lid 52 is opened, the lid 52 makes a rotational movement. The configuration in which the hinges 53 are provided below the axis X ensures such a tendency that the track of rotational movement of the lid 52 is positioned outward relative to the case body 51 in the horizontal direction. This tendency makes it difficult for dust attached to the inner surface of the lid 52 to enter the case body 51.

The opening 60 of the case body 51 is positioned to permit the axis X of the exhaust side inner cylinder 62 to pass through the opening 60. This configuration makes the exhaust port 72 more visually recognizable when the lid 52 is removed from the case body 51, ensuring excellent maintainability of the case body 51. In a state in which the lid 52 is opened and the air cleaner element 42 is removed, the exhaust port 72 is hidden by the case body 51 as seen from vertically above the exhaust port 72.

The exhaust side inner cylinder 62 protrudes diagonally upward and toward the internal space 43, and a protrusion end portion 62a of the exhaust side inner cylinder 62 defines the exhaust port 72. The protrusion end portion 62a of the exhaust side inner cylinder 62 is inclined relative to an imaginary radial plane R in an angle direction AD. The imaginary radial plane R is orthogonal to the axis X of the exhaust side inner cylinder 62. The angle direction AD is a direction from the imaginary radial plane R toward an imaginary vertical plane V. This configuration ensures that in a state in which the lid 52 is opened and the air cleaner element 42 is removed, the area of the exhaust port 72 as seen from vertically above the exhaust port 72 is smaller than the area of the exhaust port 72 as seen from the axis direction of the axis X of the exhaust side inner cylinder 62.

When the air cleaner element 42 is removed for maintenance of the air cleaner 40, there may be a case where dust attached to the inner surface of the air cleaner element 42 or the air cleaner case 41 scatters and then falls under the dust's own weight. Even in this case, the scattering dust is less likely to enter the exhaust port 72. Specifically, the protrusion end portion 62a of the exhaust side inner cylinder 62 is substantially along the imaginary vertical plane V. That is, when the exhaust side inner cylinder 62 is seen from vertically above the exhaust side inner cylinder 62, the exhaust port 72 is not visually recognizable. This ensures a sufficiently low possibility of scattering dust entering the exhaust port 72 when the air cleaner element 42 is removed.

The protrusion end portion 62a of the exhaust side inner cylinder 62 has an upper end portion that is provided below an upper end portion of the opening 60 of the case body 51 in the axis direction of the axis X. In other words, when the case body 51 and the exhaust side inner cylinder 62 are seen from vertically above the case body 51 and the exhaust side inner cylinder 62, the protrusion end portion 62a of the exhaust side inner cylinder 62 is hidden by the case body 51, that is, not visually recognizable. This configuration ensures that dust falling from above the case body 51 is prevented from entering the exhaust port 72, which is defined by the protrusion end portion 62a of the exhaust side inner cylinder 62.

Figure 9:
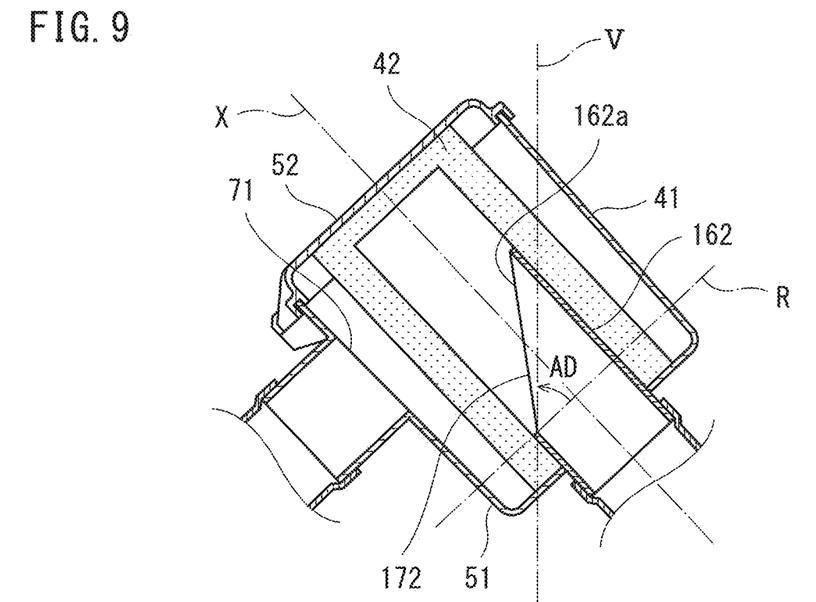
FIG. 9 is a longitudinal sectional view of a first modification of the air cleaner illustrated in FIG. 8.

FIG. 9 is a longitudinal sectional view of a first modification of the air cleaner 40 illustrated in FIG. 8. It is to be noted that those elements common to the first modification and the one embodiment are designated by like or identical reference numerals and will not be elaborated upon in the following description. As illustrated in FIG. 9, in the first modification, an exhaust side inner cylinder 162 has a protrusion end portion 162a. The protrusion end portion 162a is inclined to exceed the imaginary vertical plane V in the angle direction AD, which is a direction from the imaginary radial plane R toward the imaginary vertical plane V. This configuration ensures that when the air cleaner element 42 is removed for maintenance purposes, even if scattering dust falls under the dust's own weight, the scattering dust is less likely to enter an exhaust port 172.

Figure 10:
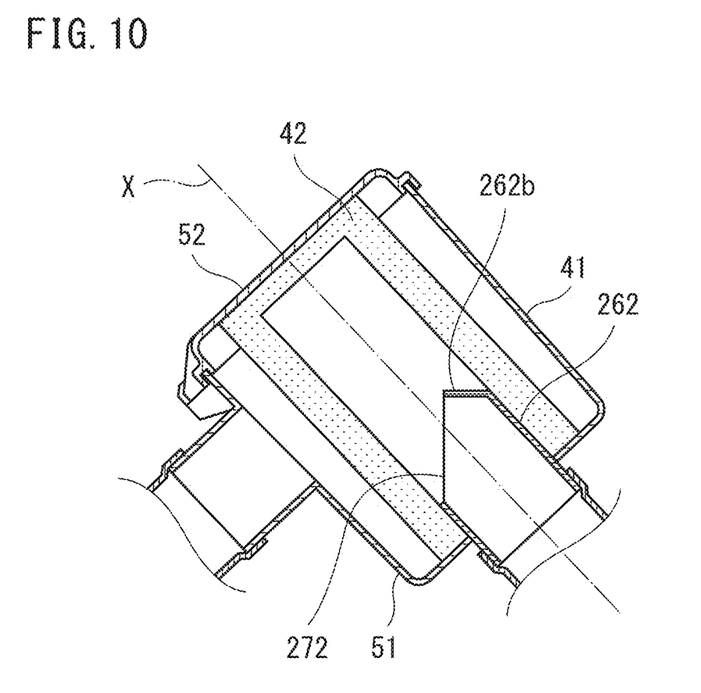
FIG. 10 is a longitudinal sectional view of a second modification of the air cleaner illustrated in FIG. 8.

FIG. 10 is a longitudinal sectional view of a second modification of the air cleaner 40 illustrated in FIG. 8. It is to be noted that those elements common to the second modification and the one embodiment are designated by like or identical reference numerals and will not be elaborated upon in the following description. As illustrated in FIG. 10, in the second modification, an exhaust side inner cylinder 262 has a leading end portion 262a in the axis direction of the axis X. The leading end portion 262a is spaced apart from the inner circumferential surface of the air cleaner element 42. Specifically, the leading end portion 262a, which is provided at an upper portion of the exhaust side inner cylinder 262, protrudes toward the axis X. In this manner, the leading end portion 262a is spaced apart from the inner circumferential surface of the air cleaner element 42. In other words, the exhaust side inner cylinder 262 may have a periscope shape. This configuration reduces the area over which the exhaust side inner cylinder 262 is in contact with the inner circumferential surface of the air cleaner element 42, resulting in an increase in effective filtration area of the air cleaner element 42.

It will be appreciated that the present disclosure will not be limited to the above-described one embodiment. For example, the shield wall that covers the opening 35a of the intake box 14 from ahead of the opening 35a may not necessarily be a part of the heat shield cover 18. Instead, the shield wall may be an element that protrudes downward from the hood 15. Alternatively, the shield wall that covers the opening 35a of the intake box 14 from ahead of the opening 35a may be an element that protrudes from the front upper cover 49 toward the lower surface of the hood 15. Alternatively, the shield wall that covers the opening 35a of the intake box 14 from ahead of the opening 35a may be an element different from the front cover 6. Alternatively, the intake box 14 may be covered by the hood 15 from above the intake box 14.

The heat shield cover 18 may be omitted. The air guided to the opening 35a of the intake box 14 may be air inflowing through the air guide holes 16a of the front grille 16. That is, the front opening of the front cover 6 may be served by the air guide holes of the front grille 16. In this case, the hood 15 may not necessarily have the front opening 15a. The opening 35a of the intake box 14 will not be limited to an opening through which the internal space 32 is exposed in the forward direction. Instead, the opening 35a may be an opening through which the internal space 32 is exposed in any other horizontal direction, such as a lateral direction.

In the air cleaner 40, the protrusion end portion 62a of the exhaust side inner cylinder 62 may have an angle between the imaginary radial plane R the imaginary vertical plane V in the angle direction AD. The exhaust side inner cylinder 62 of the air cleaner 40 may not necessarily be integrally formed with the case body 51. Instead, the exhaust side inner cylinder 62 may be an element separate from the case body 51. In the air cleaner 40, the exhaust side inner cylinder 62 and the exhaust side outer cylinder 63 may be different from each other in diameter. For example, the exhaust side inner cylinder 62 may be larger in diameter than the exhaust side outer cylinder 63. The exhaust port of the air cleaner case 41 may be defined by a protrusion end portion of a second cylinder that surrounds a first cylinder communicating with the outside.

The opening of the case body 51 of the air cleaner 40 may be an opening that is provided at the side circumferential wall of the case body 51 and that is closable by a lid. In this case, the air cleaner 40 may be provided such that at least a part of the lid of the air cleaner 40 is exposed through the maintenance opening 19a of the seat support panel 19 in a top view of the maintenance opening 19a.

While the present disclosure has been described in connection with embodiments, it will be understood that the above-described embodiments will not be intended in a limiting sense and that omissions, substitutions, additions, and/or alterations may be made to the embodiments. It will also be understood that the components and/or configurations described in the embodiments may be combined to form a new embodiment. For example, one or some of the configurations described in the embodiments may be isolated from the rest of the configurations in any manner deemed suitable. It will further be understood that the components and/or configurations described in the accompanying drawings and detailed description not only include those components and/or configurations essential for problem solving purposes but also include those components and/or configurations inessential for problem solving purposes.

What is claimed is:

1. An off-road vehicle, comprising:
   an intake duct defining a clean conduit; and
   an air cleaner connected to the intake duct, the air cleaner comprising:
     an air cleaner case defining an internal space of the air cleaner; and
     an air cleaner element contained in the air cleaner case and dividing the internal space into a dirty region and a clean region, the air cleaner element comprising a filter, the air cleaner case comprising:
       an intake port facing the dirty region;
       an exhaust port facing the clean region and communicating with the clean conduit of the intake duct; and
       a cylinder protruding diagonally upward and toward the internal space, the cylinder having a protrusion end portion that defines the exhaust port and is inclined relative to an imaginary radial plane in an angle direction from the imaginary radial plane toward an imaginary vertical plane, the imaginary radial plane being orthogonal to an axis of the cylinder,
   wherein the protrusion end portion of the cylinder is substantially along the imaginary vertical plane.

2. The off-road vehicle according to claim 1, further comprising:
   a seat support panel above the air cleaner and supporting a seat, the seat support panel having a maintenance opening,
   wherein in a top view of the maintenance opening, at least a part of a lid of the air cleaner is exposed through the maintenance opening.

3. The off-road vehicle according to claim 1, wherein:
   the intake port faces the exhaust port defined by the protrusion end portion.

4. The off-road vehicle according to claim 1, wherein:
   the intake port is below the axis of the cylinder.

5. The off-road vehicle according to claim 1, wherein:
   the intake port is above a lower end portion of the protrusion end portion in an axis direction of the axis of the cylinder.

6. The off-road vehicle according to claim 1, wherein the air cleaner case comprises:
   a case body having an opening through which the internal space is exposed upward; and
   a lid configured to close the opening of the case body from above the opening, and
   wherein an upper end portion of the protrusion end portion is below an upper end portion of the opening of the case body in an axis direction of the axis of the cylinder.

7. The off-road vehicle according to claim 1, wherein:
   an axis of the air cleaner case is inclined upward and toward one side of a width direction of the off-road vehicle.

8. The off-road vehicle according to claim 7, further comprising:
   a first intake duct in a space below the air cleaner case and connected to the intake port of the air cleaner.

9. The off-road vehicle according to claim 7, further comprising:
   a second intake duct in a space below the air cleaner case and connected to the exhaust port of the air cleaner.

10. The off-road vehicle according to claim 1, wherein the air cleaner case comprises:
    a case body having an opening through which the internal space is exposed diagonally upward; and
    a lid configured to close the opening of the case body from diagonally above the opening, and wherein the opening of the case body is to permit the axis of the cylinder to pass through the opening.

11. The off-road vehicle according to claim 10, further comprising:
a hinge below the axis of the cylinder and rotationally movably connecting the lid to the case body.

12. The off-road vehicle according to claim 1, wherein:
the air cleaner case comprises a case body having an opening through which the internal space is exposed upward, and
the case body comprises the intake port and the exhaust port.

13. The off-road vehicle according to claim 1, wherein:
the air cleaner element has a bottomed cylinder shape.

14. The off-road vehicle according to claim 1, wherein:
when the air cleaner case is viewed from vertically above, the exhaust port is not visually recognizable.

15. The off-road vehicle according to claim 1, wherein:
the air cleaner case comprises a case body having a round-cylindrical circumferential wall, and the intake port is at the round-cylindrical circumferential wall.

16. An off-road vehicle, comprising:
an intake duct defining a clean conduit; and
an air cleaner connected to the intake duct, the air cleaner comprising:
an air cleaner case defining an internal space of the air cleaner; and
an air cleaner element contained in the air cleaner case and dividing the internal space into a dirty region and a clean region, the air cleaner element comprising a filter, the air cleaner case comprising:
an intake port facing the dirty region;
an exhaust port facing the clean region and communicating with the clean conduit of the intake duct;
a cylinder protruding diagonally upward and toward the internal space, the cylinder having a protrusion end portion that defines the exhaust port and is inclined relative to an imaginary radial plane in an angle direction from the imaginary radial plane toward an imaginary vertical plane, the imaginary radial plane being orthogonal to an axis of the cylinder; and
an on-vehicle article adjacent to the air cleaner,
wherein the air cleaner case comprises:
a case body having an opening through which the internal space is exposed upward; and
a lid configured to close the opening of the case body from above the opening, and
wherein an axis of the air cleaner is inclined relative to a vertical direction in a direction in which the lid of the air cleaner case is away from the on-vehicle article.

17. The off-road vehicle according to claim 16, wherein:
the air cleaner has an outer circumferential surface having a substantially cylindrical shape, and
a size of the air cleaner in a direction of the axis of the air cleaner is larger than a size of the air cleaner in a radial direction of the air cleaner.

18. The off-road vehicle according to claim 16, wherein:
the on-vehicle article comprises a fuel tank.

19. The off-road vehicle according to claim 16, further comprising:
a seat support panel above the air cleaner and supporting a seat, the seat support panel having a maintenance opening,
wherein the air cleaner is inclined toward one side of a width direction of the off-road vehicle, the one side being a direction toward the maintenance opening.

20. An off-road vehicle, comprising:
an intake duct defining a clean conduit; and
an air cleaner connected to the intake duct, the air cleaner comprising:
an air cleaner case defining an internal space of the air cleaner; and
an air cleaner element contained in the air cleaner case and dividing the internal space into a dirty region and a clean region, the air cleaner element comprising a filter, the air cleaner case comprising:
an intake port facing the dirty region;
an exhaust port facing the clean region and communicating with the clean conduit of the intake duct; and
a cylinder protruding diagonally upward and toward the internal space, the cylinder having a protrusion end portion that defines the exhaust port and is inclined relative to an imaginary radial plane in an angle direction from the imaginary radial plane toward an imaginary vertical plane, the imaginary radial plane being orthogonal to an axis of the cylinder,
wherein the air cleaner element is supported by the cylinder by being fitted with the cylinder.

* * * * *